Patented May 16, 1933

1,908,731

UNITED STATES PATENT OFFICE

ARTHUR MAURICE CLARK, OF NORTON-ON-TEES, ENGLAND, ASSIGNOR TO IMPERIAL CHEMICAL INDUSTRIES LIMITED, OF LONDON, ENGLAND, A BRITISH COMPANY

RECOVERY OF SULPHUR DIOXIDE FROM GASES

No Drawing. Application filed May 4, 1932, Serial No. 609,285, and in Great Britain May 12, 1931.

This invention relates to processes of the kind in which gases containing sulphur dioxide in small concentration, e. g. gases derived from the roasting of sulphide ores, are treated with a suitable solvent from which the sulphur dioxide is subsequently expelled by heating and/or reduction of pressure, the recovered solvent being used again for dissolving further quantities of sulphur dioxide.

In processes of this kind, it is known to employ aqueous solutions of alkali hydroxides or alkali sulphites as solvents but it is to be noted that such solutions on heating, with or without reduction in pressure, do not give off their total content of sulphur dioxide, a solution containing approximately one equivalent of sulphur dioxide per equivalent of alkali being stable at a raised temperature. Consequently, in a cyclic process, the quantity of sulphur dioxide recovered per cycle is only a fraction of the total quantity of sulphur dioxide contained in the solvent.

I have now found that the quantity of sulphur dioxide recovered per cycle can be materially increased by adding to the solvent a substance capable of imparting thereto an acidity which increases with increase of temperature. By acidity is meant a surplus of hydrogen ions over hydroxyl ions.

The invention consists accordingly in a process for recovering sulphur dioxide from gases containing the same by treatment with an aqueous solution of an alkali hydroxide and/or alkali sulphite containing a substance giving rise to an acidity which increases with increase of temperature, and which does not give rise to a permanent precipitate under the conditions of working.

The added substance should have a relatively small effect on the absorption at the lower temperature while assisting in the displacement of the sulphur dioxide at the higher temperature. In the preferred form of the invention the aqueous solution of an alkali hydroxide and/or alkali sulphite is employed in conjunction with a salt of a weak base and a strong acid, e. g. aluminium chloride, which is capable of undergoing increasing hydrolysis with rise in temperature, thereby increasing the hydrogen ion concentration, and which does not form an insoluble precipitate under the conditions of working. Ferric chloride is unsuitable in this last respect. On the other hand, ammonium chloride is unsuitable by reason of the volatility of the ammonia. In the case of chromium chloride, a precipitate is at first formed on removal of $SO_2$ which is redissolved on absorption of further quantities of $SO_2$.

Example

Sodium sulphite in saturated aqueous solution at 20° C. was added in the molecular proportion of .75 parts of sodium sulphite to 1 part of aluminium chloride in 40% aqueous solution. A little sulphur dioxide was evolved in the course of mixing. A precipitate is formed which redissolves on stirring. The solution was then raised to a temperature of 100° C. when substantially the whole of the sulphur dioxide content was evolved. The residual solution was cooled to 20° C. and used for washing a gas containing 5 per cent of sulphur dioxide, the quantity of sulphur dioxide absorbed amounting to 6% by weight of the solution. On heating again to 100° C. substantially the whole of the sulphur dioxide was recovered in the form of a concentrated gas; and the residual solution was used again in the washing step.

I claim:

1. A process for recovering sulphur dioxide from gases containing the same, which consists in treating the said gases with an aqueous solution of an alkali hydroxide and/or alkali sulphite containing a substance giving rise to an acidity which increases with increase of temperature and which does not give rise to a permanent precipitate under the conditions of working and subsequently subjecting the used solvent to heating with or without reduction of pressure.

2. Process as claimed in claim 1, in which the substance is aluminium chloride.

In testimony whereof, I affix my signature.

ARTHUR MAURICE CLARK.